US012798460B2

(12) United States Patent
Yu et al.

(10) Patent No.: US 12,798,460 B2
(45) Date of Patent: *Nov. 17, 2026

(54) ELECTRIC WING-OUT HEADREST

(71) Applicants: HYUNDAI MOTOR COMPANY, Seoul (KR); KIA CORPORATION, Seoul (KR); SEOYONCNF, Ulsan (KR)

(72) Inventors: Sang Uk Yu, Seoul (KR); Tae Hoon Lee, Suwon-si (KR); Sang Ho Kim, Incheon (KR); Seung Young Lee, Seoul (KR); Jun Namgoong, Asan-si (KR); Yong Jun Shin, Ulsan (KR)

(73) Assignees: HYUNDAI MOTOR COMPANY, Seoul (KR); KIA CORPORATION, Seoul (KR); SEOYONCNF, Ulsan (KR)

( * ) Notice: Subject to any disclaimer, the term of this patent is extended or adjusted under 35 U.S.C. 154(b) by 103 days.

This patent is subject to a terminal disclaimer.

(21) Appl. No.: 18/941,360

(22) Filed: Nov. 8, 2024

(65) Prior Publication Data

US 2025/0065790 A1 Feb. 27, 2025

Related U.S. Application Data

(63) Continuation of application No. 18/117,057, filed on Mar. 3, 2023, now Pat. No. 12,162,390.

(30) Foreign Application Priority Data

Oct. 26, 2022 (KR) ........................ 10-2022-0138825

(51) Int. Cl.
*B60N 2/885* (2018.01)
*B60N 2/853* (2018.01)

(52) U.S. Cl.
CPC ............. *B60N 2/885* (2018.02); *B60N 2/853* (2018.02)

(58) Field of Classification Search
CPC ...................................................... B60N 2/885
See application file for complete search history.

(56) References Cited

U.S. PATENT DOCUMENTS

| | | | |
|---|---|---|---|
| 2023/0202369 | A1 | 6/2023 | Kim et al. |
| 2024/0075861 | A1 | 3/2024 | Xiao et al. |
| 2024/0140288 | A1 | 5/2024 | Yu et al. |

FOREIGN PATENT DOCUMENTS

| | | | |
|---|---|---|---|
| CN | 109476248 | A | 3/2019 |
| CN | 110920493 | A | 3/2020 |
| CN | 112977216 | A | 6/2021 |
| CN | 213799368 | U | 7/2021 |
| CN | 113263967 | A | 8/2021 |
| CN | 214984979 | U | 12/2021 |
| CN | 113928198 | A | 1/2022 |
| CN | 216886388 | U | 7/2022 |

(Continued)

*Primary Examiner* — Timothy J Brindley

(74) *Attorney, Agent, or Firm* — MCDONNELL BOEHNEN HULBERT & BERGHOFF LLP

(57) ABSTRACT

An automatically operatable electric wing-out headrest includes a motor having a lead screw configured to adjust forward-and-rearward rotation of wing-out pads respectively mounted on the opposite sides of a headrest body, a first slider coupled to the lead screw so as to be movable upwards and downwards, a second slider configured to contact the first slider so as to be movable forwards and rearwards, and a wing-out link connected to the second slider to rotate a wing-out frame.

14 Claims, 10 Drawing Sheets

(56) References Cited

FOREIGN PATENT DOCUMENTS

| | | | |
|---|---|---|---|
| CN | 115230551 | A | 10/2022 |
| CN | 117507975 | A | 2/2024 |
| DE | 202018102807 | U1 | 5/2018 |
| EP | 3492310 | A1 | 6/2019 |
| JP | 2005066092 | A | 3/2005 |
| KR | 20180072939 | A | 7/2018 |

Prior Art

ELECTRIC WING-OUT HEADREST

CROSS REFERENCE TO RELATED APPLICATIONS

The present application is a continuation of U.S. patent application Ser. No. 18/117,057, filed Mar. 3, 2023 which claims, under 35 U.S.C. § 119 (a), the benefit of priority from Korean Patent Application No. 10-2022-0138825, filed on Oct. 26, 2022, the entire contents of which are incorporated herein by reference.

BACKGROUND

(a) Technical Field

The present disclosure relates to an electric wing-out headrest. More particularly, it relates to an electric wing-out headrest configured to adjust forward-and-rearward rotation of wing-out pads respectively mounted on the opposite portions of a headrest body in an electric manner.

(b) Background Art

As is well known, a vehicle seat is manufactured in a structure that fundamentally includes a seat cushion on which an occupant is seated, a seatback against which the back of the occupant rests, and a headrest mounted on top of the seatback to support the head of the occupant. The headrest supports the neck and head of the occupant to provide comfort in the neck area and also has a function of preventing the head from being tilted rearwards in the event of vehicle collision, thereby reducing the risk of neck injury to the occupant.

Particularly, in order to more reliably support the head of the occupant in consideration of the trend of luxury vehicles and expansion of convenience devices, proposed is a wing-out headrest including wing-out pads respectively disposed at the opposite portions of a headrest body, wherein the wing-out pads are rotatable by a predetermined angle.

Referring to FIG. 1, the wing-out headrest includes wing-out pads 2 respectively disposed at the opposite portions of a headrest body 1, wherein the wing-out pads 2 are rotatable by a predetermined angle. The wing-out pads 2 are normally arranged in a state of being substantially horizontal to the headrest body 1.

Meanwhile, when an occupant wants to narrowly adjust the angle of the wing-out pads 2 to lean the occupant's head against the wing-out headrest, the occupant directly grabs the wing-out pads 2 by hand and rotates the same by a predetermined angle toward the inner direction of the headrest body 1 (direction toward the opposite portions of the occupant's head). Accordingly, the wing-out pads 2 may be appropriately adjusted so as to cover the opposite portions of the occupant's head.

Accordingly, the wing-out pads 2 rotated by a predetermined angle with respect to the headrest body 1 are arranged to cover the opposite portions of the occupant's head, and the wing-out pads 2 may provide a comfortable feeling and support by preventing the occupant's head from leaning to one side while the occupant sleeps. Accordingly, the wing-out pad 2 may protect the occupant's head in the event of vehicle lateral collision.

FIG. 2 is a front view showing the internal structure of the wing-out headrest of the related art, and reference numeral 10 denotes a fixed frame.

The fixed frame 10 is a skeleton of the headrest body 1, and has wing-out frames 20 respectively mounted at the opposite portions thereof and configured to be rotatable by a predetermined angle, wherein the wing-out frames 20 respectively form skeletons of the wing-out pads 2.

To this end, a friction torque hinge 30 is mounted between the fixed frame 10 and each of the wing-out frames 20.

More specifically, the friction torque hinge 30 is mounted between a first mounting plate 31 coupled to the fixed frame 10 and a second mounting plate 32 coupled to the wing-out frame 20, and as such, the wing-out frame 20 becomes rotatable around the friction torque hinge 30.

Accordingly, when a user grabs the wing-out pad 2 and rotates the same forwards while applying predetermined force thereto, the wing-out frame 20 may be rotated forwards around the friction torque hinge 30. As a result, the wing-out pad 2 is rotated by a predetermined angle with respect to the headrest body 1 to be arranged so as to cover the opposite portions of the occupant's head.

However, the above-described wing-out headrest of the related art has the following problems.

First, since the wing-out headrest is manually operated, an occupant needs to raise his or her arm and move his or her hand rearwards to directly grab a wing-out pad and rotate the same, which may cause inconvenience in using the wing-out headrest.

Second, since supporting force of a friction torque hinge is not strong enough to withstand pressing force by the occupant's head directly contacting the wing-out pad, the wing-out pad may be rotated rearwards to return to its original position during use.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to solve the above-described problems associated with the prior art, and it is an object of the present disclosure to provide an automatically operable electric wing-out headrest including a motor having a lead screw configured to adjust forward-and-rearward rotation of wing-out pads respectively mounted on the opposite sides of a headrest body, a first slider coupled to the lead screw so as to be movable upwards and downwards, a second slider configured to slidably contact the first slider so as to be movable forwards and rearwards, and a wing-out link connected to the second slider to rotate a wing-out frame.

In one aspect, the present disclosure provides an electric wing-out headrest including a rear frame connected to a stay, a motor mounted on the rear frame, the motor having a lead screw connected to an output part thereof, a first slider coupled to the lead screw and disposed in front of the rear frame so as to be movable upwards and downwards, a second slider coupled to the rear frame and the first slider so as to be movable forwards and rearwards, a wing-out link coupled to each of opposite portions of the second slider, a fixed frame coupled to the rear frame and spaced apart from a front portion of the second slider, and a wing-out frame hingedly coupled to the fixed frame and hingedly connected to the wing-out link.

In a preferred embodiment, the first slider may include a first body part having a screw hole formed to penetrate the first body part in a vertical direction, wherein the screw hole has the lead screw inserted thereinto and coupled thereto, the first body part having inclined stepped slides respectively formed to protrude from opposite portions thereof, wherein the inclined stepped slides are inserted into and coupled to the second slider so as to slidably contact the second slider, and elevating guide wings respectively formed to extend from opposite ends of the first body part and coupled to the rear frame so as to be movable upwards and downwards.

In another preferred embodiment, the inclined stepped slides may be formed to be inclined downwards and forwards so as to push the second slider forwards when the first slider is moved upwards or pull the second slider rearwards when the first slider is moved downwards.

In still another preferred embodiment, an elevating guide hole may be formed in each of the elevating guide wings, and an elevating guide pin inserted into the elevating guide hole may be mounted on a front portion of the rear frame.

In yet another preferred embodiment, the first body part may have an elevating distance limiting groove formed therein and configured to limit an elevating distance of the first slider, and the screw hole having the lead screw inserted thereinto and coupled thereto may be formed in a bottom surface of the elevating distance limiting groove.

In still yet another preferred embodiment, the lead screw may have a stopper nut coupled to an upper end thereof, the stopper nut having a larger diameter than a diameter of the screw hole.

In a further preferred embodiment, the second slider may include a second body part having inclined slide rails respectively formed at opposite portions of a rear portion thereof and coupled to the first slider so as to slidably contact the first slider forwards and rearwards, and push-and-pull plates respectively formed to extend from opposite ends of the second body part and respectively coupled to rear ends of the wing-out link.

In another further preferred embodiment, the inclined slide rails of the second slider may be formed to be inclined downwards or upwards and forwards so that inclined stepped slides of the first slider are respectively inserted into and mounted on the inclined slide rails so as to slidably contact the inclined slide rails.

In still another further preferred embodiment, each of the second body part and the push-and-pull plate may have a straight guide hole, and the rear frame may have a straight guide pin inserted into the straight guide hole.

In yet another further preferred embodiment, the push-and-pull plate may have coupling grooves respectively formed at an upper end and a lower end of a front surface thereof, the coupling grooves respectively having the rear ends of the wing-out link inserted thereinto and coupled thereto.

In still yet another further preferred embodiment, the wing-out link may include a pillar part having a predetermined length, first connection bars respectively formed to extend rearwards from an upper end and a lower end of the pillar part and coupled to the second slider, and second connection bars respectively formed to extend forwards from the upper end and the lower end of the pillar part and hingedly coupled to a rear portion of the wing-out frame.

In a still further preferred embodiment, the fixed frame may have hinge ends integrally formed and respectively disposed at opposite portions thereof, and the wing-out frame may have hinge cases respectively formed at inner ends thereof, the hinge cases having the hinge ends respectively inserted thereinto and coupled thereto.

In a yet still further preferred embodiment, the rear frame may have a stay coupling block formed on a rear surface thereof, the stay coupling block having the stay inserted thereinto and coupled thereto.

Other aspects and preferred embodiments of the disclosure are discussed infra.

It is understood that the terms "vehicle", "vehicular", and other similar terms as used herein are inclusive of motor vehicles in general, such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, for example, vehicles powered by both gasoline and electricity.

BRIEF DESCRIPTION OF THE FIGURES

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
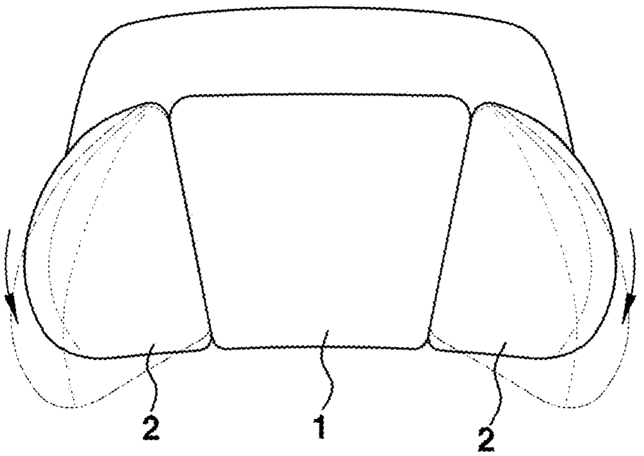
FIG. 1 is a schematic view showing an example of the appearance of a wing-out headrest.
Figure 2:
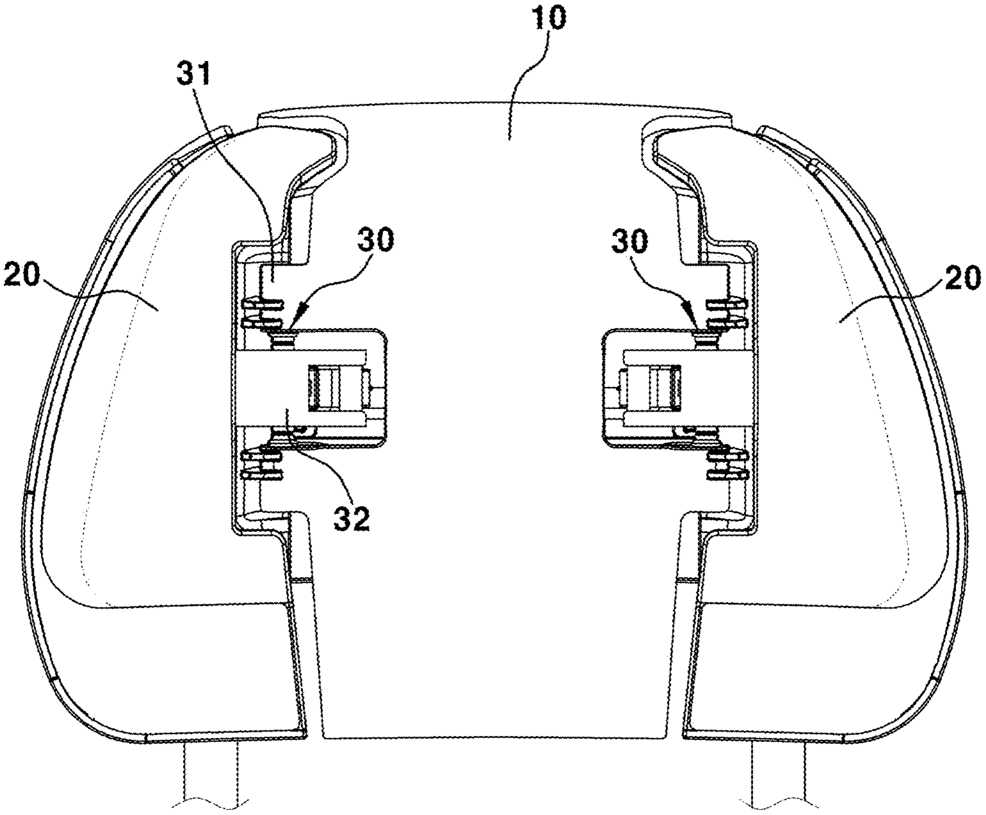
Prior Art FIG. 2
FIG. 2 is a schematic view showing a manually operated wing-out headrest of the related art.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to the exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Figure 3A:
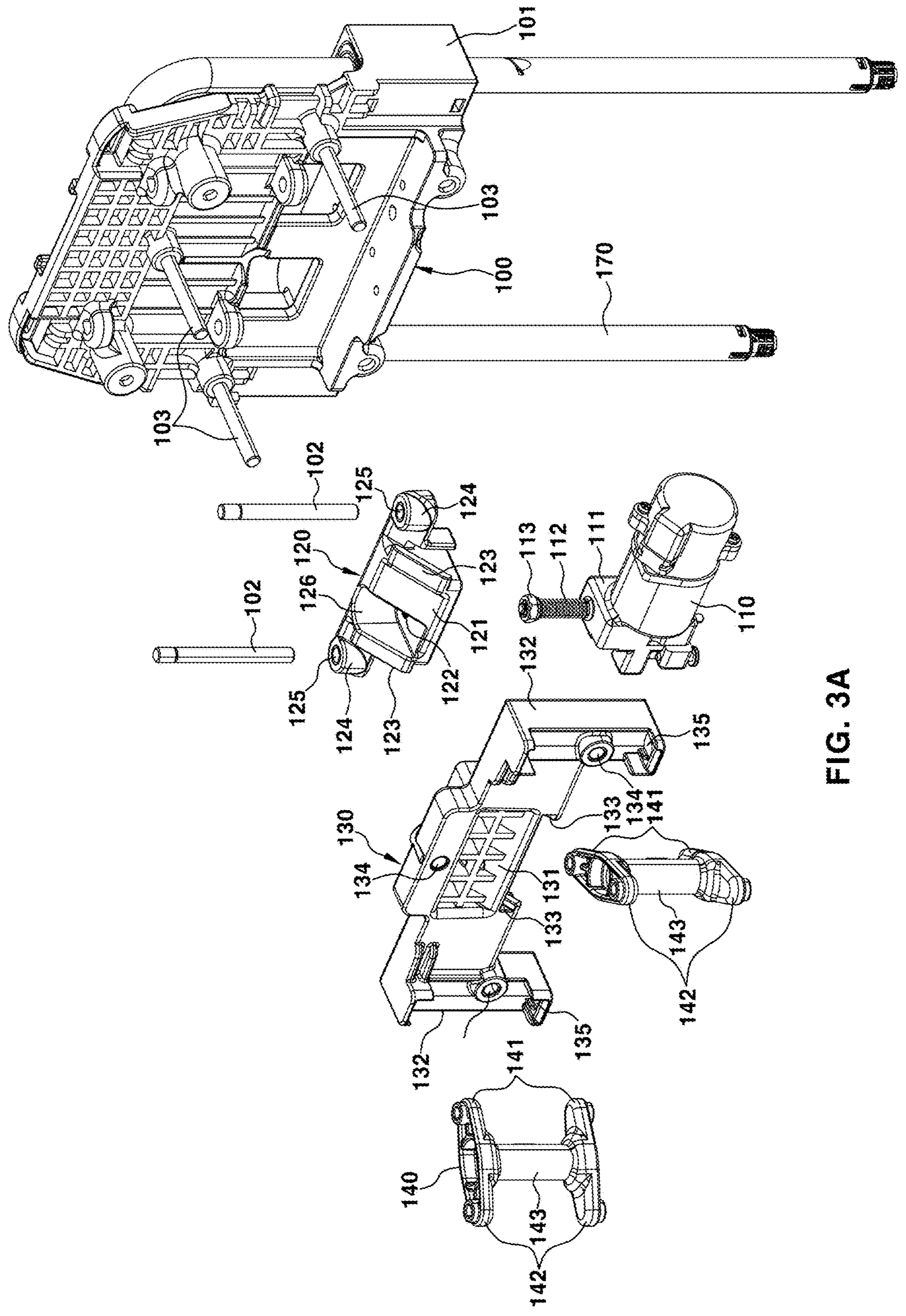
FIG. 3A and FIG. 3B are exploded perspective views showing an electric wing-out headrest according to the present disclosure.
Figure 3B:
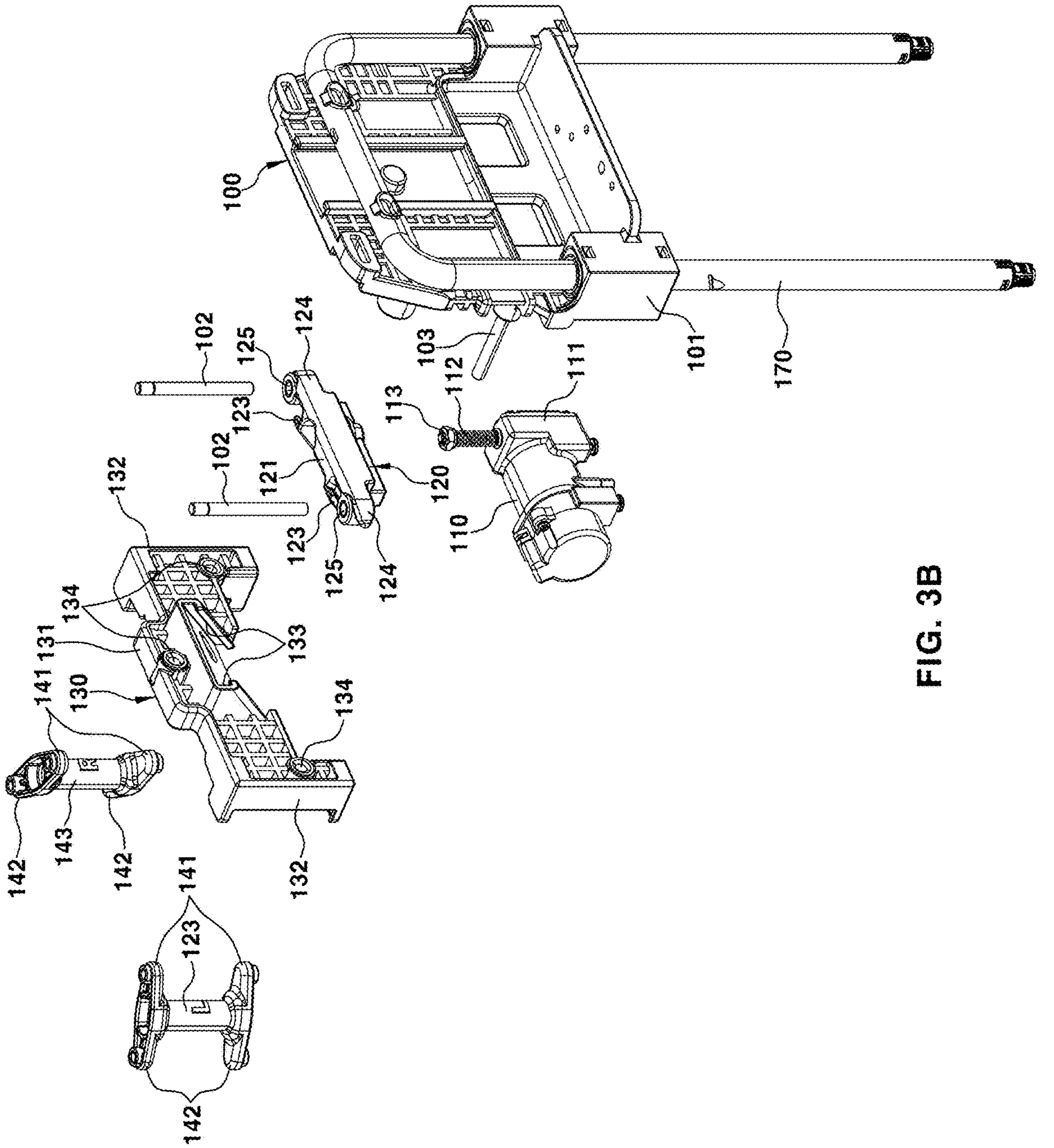

FIG. 3A and FIG. 3B are exploded perspective views showing an electric wing-out headrest according to the present disclosure, FIGS. 4, 5, 6, and 7 are perspective views showing the assembly sequence of the electric wing-out headrest according to the present disclosure, and reference numeral 100 in each drawing denotes a rear frame.

The rear frame 100 is a skeleton disposed inside a headrest and is connected to a stay 170 configured to adjust the height of the headrest.

To this end, a stay coupling block 101 having the stay 170 inserted thereinto and coupled thereto is formed on the rear surface of the rear frame 100.

The lower portion of the stay 170 inserted into and coupled to the stay coupling block 101 of the rear frame 100 may be vertically inserted into a seatback (not shown).

Accordingly, the stay 170 is inserted into the seatback or withdrawn from the inside of the seatback, thereby adjusting the height of the headrest.

Figure 4:
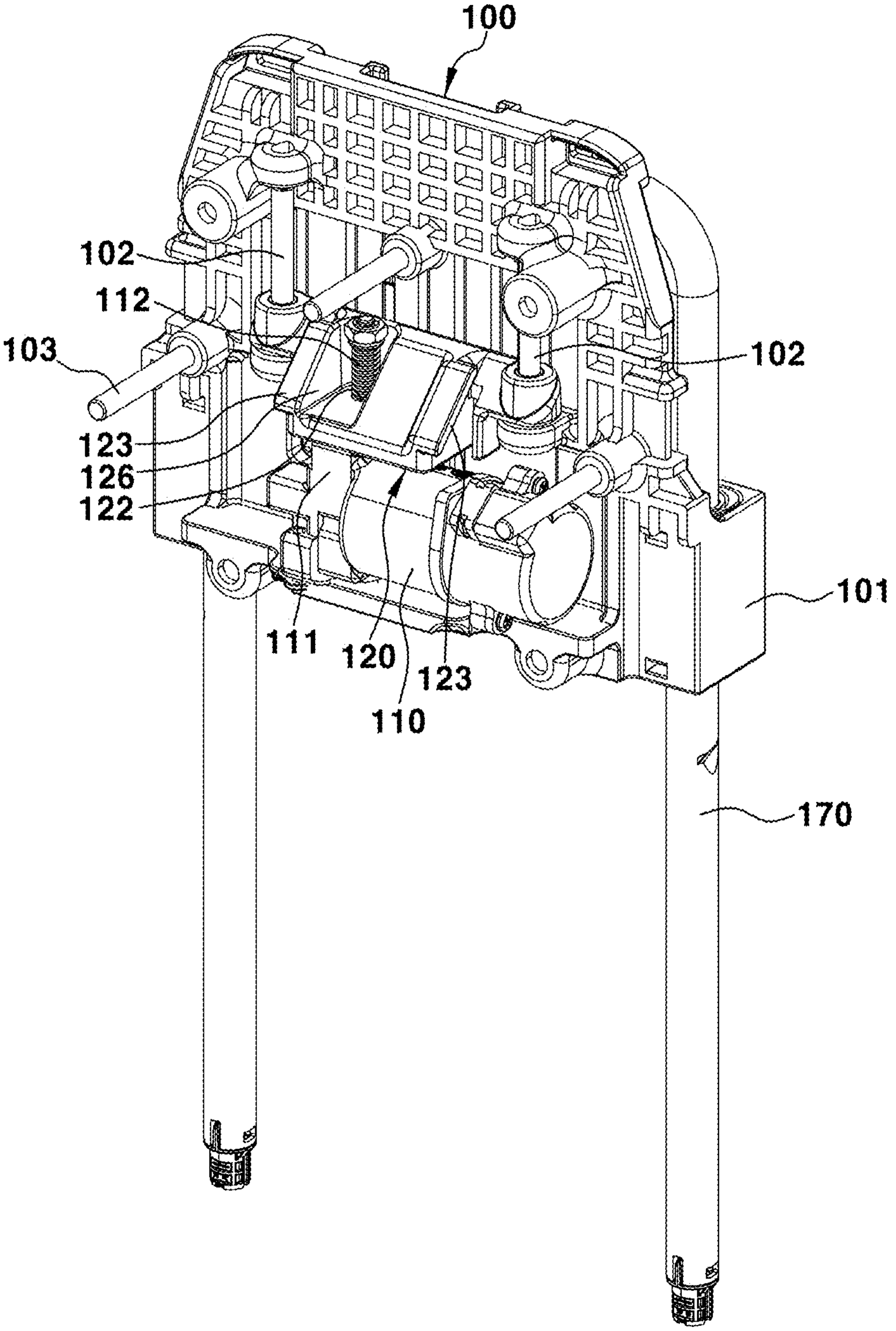
FIGS. 4, 5, 6, and 7 are perspective views showing the assembly sequence of the electric wing-out headrest according to the present disclosure.

Referring to FIG. 4, first, a motor 110 is mounted on the lower side of the front portion of the rear frame 100, and a lead screw 112, which is an output shaft, is connected to a gearbox 111 of the motor 110 and is disposed in an upward direction.

Next, a first slider 120 is mounted in the rear frame 100 and the lead screw 112 so as to be movable upwards and downwards.

That is, the first slider 120 may be coupled to the lead screw 112 and may be disposed in front of the rear frame 100 so as to be movable upwards and downwards.

To this end, as shown in FIG. 3A and FIG. 3B, the first slider 120 may include a first body part 121 having a screw hole 122 penetrating the first body part 121 in the vertical direction, where the lead screw 112 is inserted into and coupled to the screw hole 122 so as to be rotatable in place, and a pair of elevating guide wings 124 extending from opposite ends of the first body part 121 and coupled to the rear frame 100 so as to be movable upwards and downwards.

Particularly, the first body part 121 has inclined stepped slides 123 respectively protruding from opposite portions thereof, where the inclined stepped slides 123 are inserted into and coupled to a second slider 130 so as to slidably contact the second slider 130.

More specifically, as described later, the first body part 121 has the inclined stepped slides 123 formed integrally and protruding from the opposite portions thereof, and the inclined stepped slides 123 are respectively inserted into and mounted in slide rails 133 of the second slider 130 so as to slidably contact the second slider 130.

Preferably, the inclined stepped slides 123 are inclined downwards and forwards so that the inclined stepped slides 123 of the first body part 121 may push the second slider 130 forwards or pull the same rearwards when the first slider 120 is moved upwards and downwards.

In addition, an elevating guide hole 125 is formed in each of the elevating guide wings 124, and an elevating guide pin 102 inserted into each of the elevating guide holes 125 is mounted on the front portion of the rear frame 100.

Here, when the lead screw 112 is rotated in place according to driving of the motor 110, the elevating guide pin 102 mounted on the rear frame 100 is inserted into the elevating guide hole 125 of the elevating guide wing 124. Accordingly, the first slider 120 may be linearly moved in the vertical direction.

In this case, the first body part 121 has an elevating distance limiting groove 126 concavely cut and formed therein, where the elevating distance limiting groove 126 secures an arrangement space for the lead screw 112 and limits an elevating distance of the first slider 120. The screw hole 122 having the lead screw 112 inserted thereinto and coupled thereto may be formed in the bottom surface of the elevating distance limiting groove 126.

Further, a stopper nut 113 having a larger diameter than that of the screw hole 122 is coupled to the upper end of the lead screw 112.

Accordingly, the lead screw 112 may pass through the screw hole 122 to be easily disposed in the elevating distance limiting groove 126 of the first body part 121. Particularly, when the first slider 120 including the first body part 121 is moved upwards to the maximum position, the stopper nut 113 serves as a stopper configured to contact the outer peripheral surface of the screw hole 122 formed in the bottom surface of the elevating distance limiting groove 126, and as such, the maximum upward movement of the first slider 120 may be limited.

Figure 5:
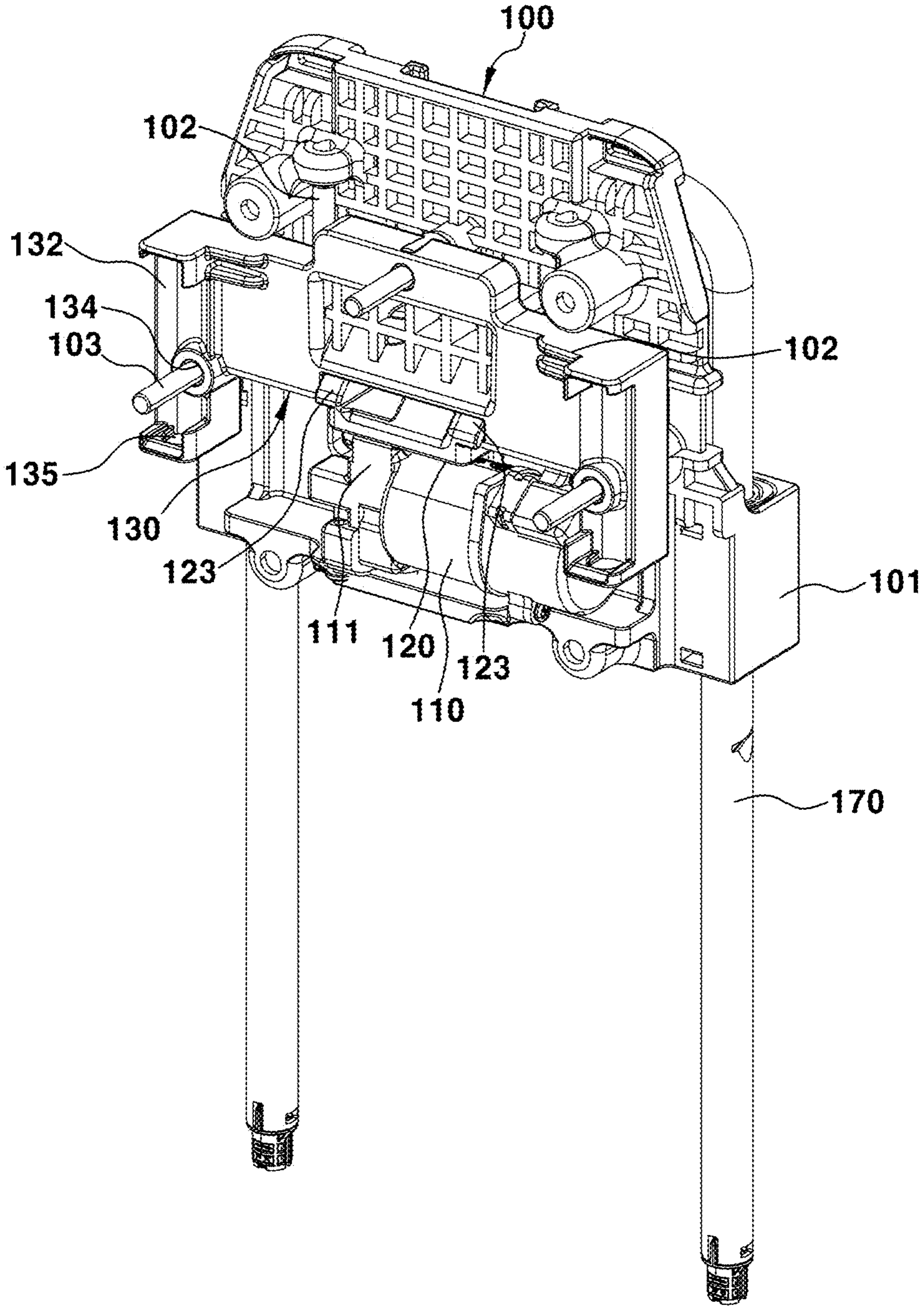

Referring to FIG. 5, the second slider 130 is coupled to the rear frame 100 and the first slider 120 so as to be movable forwards and rearwards.

As shown in FIG. 3A and FIG. 3B, the second slider 130 includes a second body part 131 having the inclined slide rails 133 respectively formed at the opposite portions of the rear portion thereof, and push-and-pull plates 132 respectively extending from the opposite ends of the second body part 131.

Particularly, the inclined slide rail 133 formed on the second body part 131 of the second slider 130 is inclined downwards and forwards so that the inclined stepped slide 123 of the first slider 120 slidably contacts the inclined slide rail 133 so as to move the inclined slide rail 133 forwards and rearwards. Here, the inclined slide rail 133 may be inclined upwards depending on the designed movement direction.

In this case, the inclined stepped slide 123 of the first slider 120 is inserted into the inclined slide rail 133 formed on the second body part 131 of the second slider 130 and is slidably mounted thereon.

Additionally, each of the second body part 131 and the push-and-pull plate 132 of the second slider 130 has a straight guide hole 134 penetrating the second slider 130 in the forward-and-rearward direction, and the rear frame 100 has a straight guide pin 103 mounted thereon and inserted into the straight guide hole 134.

Accordingly, when the first slider 120 is moved upwards, the inclined stepped slide 123 slidably contacts the slide rail 133 to push the the slide rail 133 forwards, and as such, the second slider 130 may be moved forwards. On the other hand, when the first slider 120 is moved downwards, the inclined stepped slide 123 slidably contacts the slide rail 133 to pull the slide rail 133 rearwards, and as such, the second slider 130 may be moved rearwards.

In addition, since the straight guide pin 103 mounted on the rear frame 100 is inserted into the straight guide hole 134 formed in each of the second body part 131 and the push-and-pull plate 132, the forward movement and the rearward movement of the second slider 130 may be performed linearly.

Wing-out elements may be separately mounted or integrally formed on both sides of the second slider 130. The wing-out element may be configured to push or pull the wing-out frame 150.

Preferably, the wing-out element may be configured as a wing-out link 140 having one end fastened to both sides of the second slider 130 and the other end hinged to the wing-out frame 150.

Figure 6:
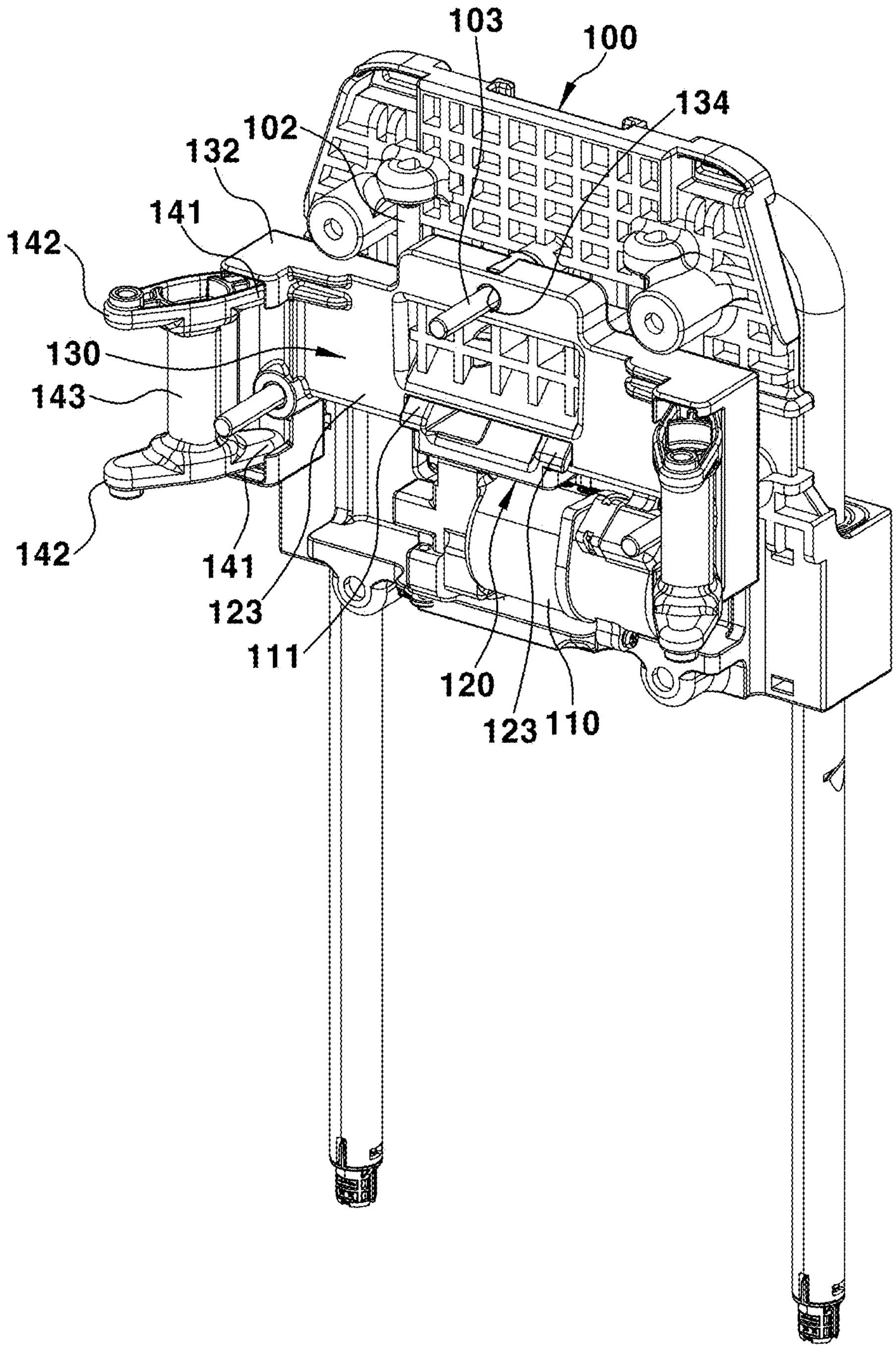

Referring to FIG. 6, a wing-out link 140 is coupled to each of the opposite portions of the second slider 130.

To this end, coupling grooves 135 having the rear end of the wing-out link 140 inserted thereinto and coupled thereto are respectively formed at the upper end and the lower end of the front surface of the push-and-pull plate 132 of the second slider 130.

Here, as a link configured to push a wing-out frame 150 forwards or pull the same rearwards, the wing-out link 140 includes a pillar part 143 having a predetermined length, first connection bars 141 respectively extending rearwards from the upper end and the lower end of the pillar part 143, and respectively inserted into and coupled to the coupling grooves 135 of the push-and-pull plate 132, and second connection bars 142 respectively extending forwards from the upper end and the lower end of the pillar part 143 and hinged to the rear portion of the wing-out frame 150.

Figure 7:
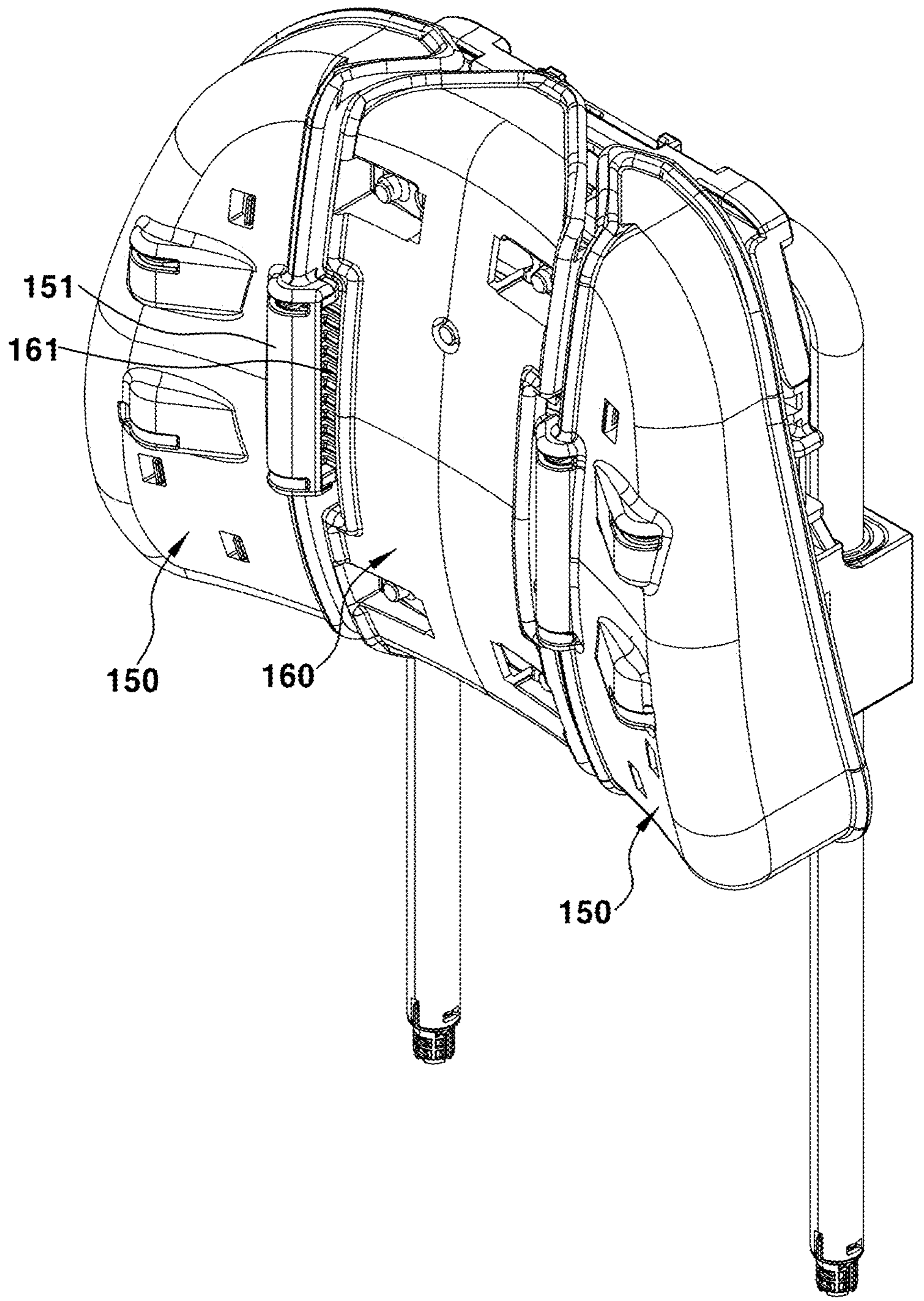

Referring to FIG. 7, a fixed frame 160 covering the motor 110, the first slider 120, and the second slider 130 is fixedly mounted on the front portion of the rear frame 100, and the fixed frame 160 is spaced apart from the front portion of the second slider 130.

In addition, the wing-out frame 150 hinged to the second connection bars 142 of the wing-out link 140 is also hinged to the fixed frame 160.

To this end, hinge ends 161 are integrally formed and respectively provided at opposite portions of the fixed frame 160. Further, hinge cases 151 having the hinge ends 161 inserted thereinto and coupled thereto are respectively formed at inner ends of the wing-out frame 150.

Accordingly, when the second slider 130 is moved forwards, the push-and-pull plate 132 pushes the wing-out link 140 forwards, and the wing-out link 140 also pushes the wing-out frame 150 forwards. In this manner, the wing-out frame 150 is rotated inwards around the hinge end 161 in the hinge case 151.

On the other hand, when the second slider 130 is moved rearwards, the push-and-pull plate 132 pulls the wing-out link 140 rearwards, and the wing-out link 140 also pulls the wing-out frame 150 rearwards. In this manner, the wing-out frame 150 is rotated outwards around the hinge end 161 in the hinge case 151.

Hereinafter, a description will be given as to the operation flow of the electric wing-out headrest of the present disclosure having the above-described configuration.

Figure 8:
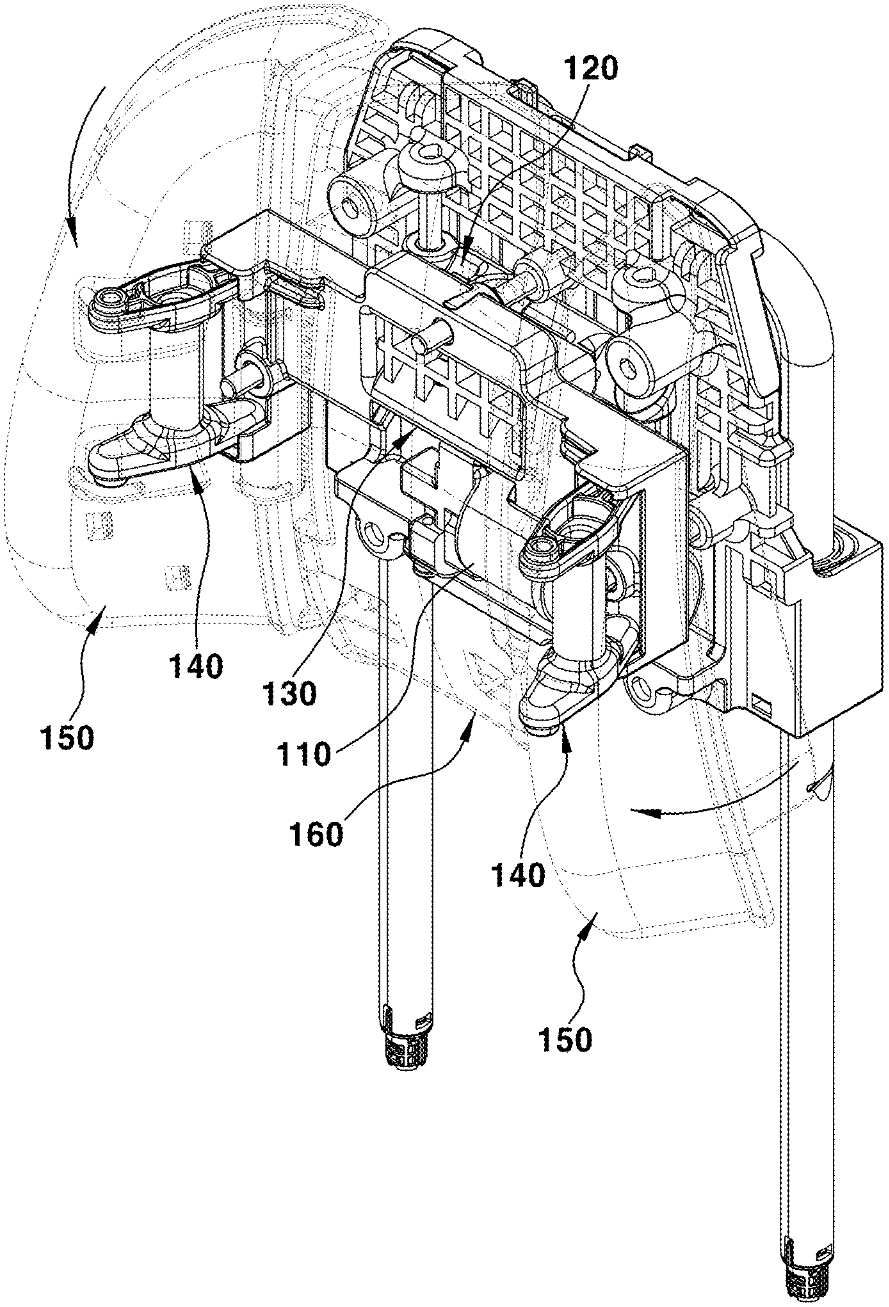
FIG. 8 is a perspective view showing the state in which a wing-out frame of the electric wing-out headrest according to the present disclosure is rotated inwards.
Figure 9:
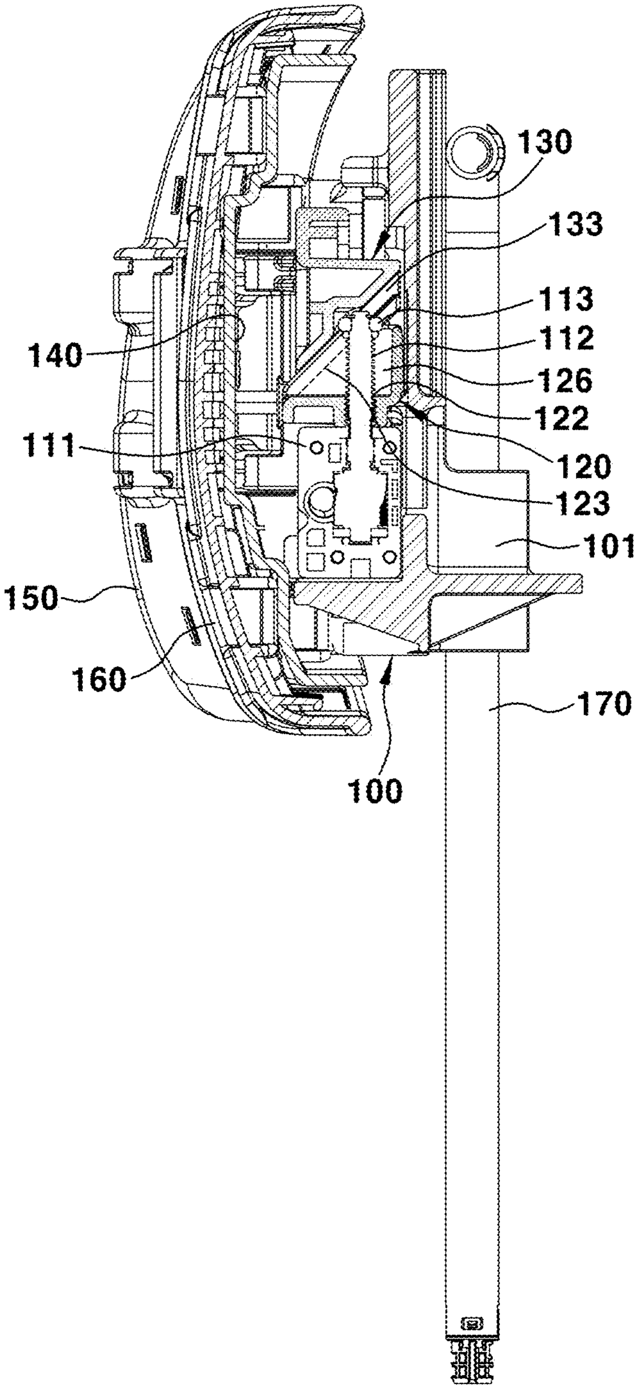
FIG. 9 is a side view showing the state in which the wing-out frame of the electric wing-out headrest according to the present disclosure is rotated outwards.
Figure 10:
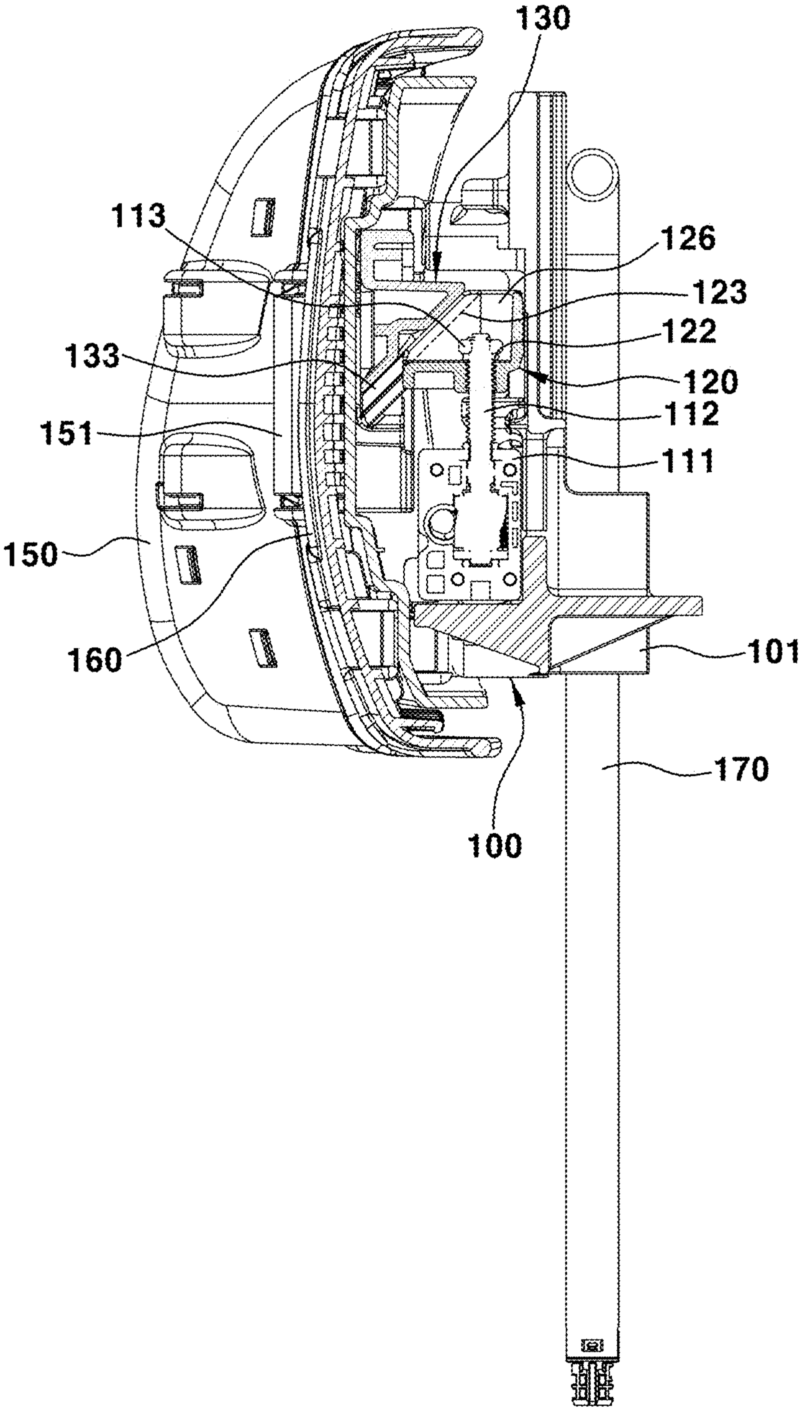
FIG. 10 is a side view showing the state in which the wing-out frame of the electric wing-out headrest according to the present disclosure is rotated inwards.

FIGS. 7 and 9 show the state in which the wing-out frame of the electric wing-out headrest according to the present disclosure is rotated outwards to return to its original position, and FIGS. 8 and 10 show the state in which the wing-out frame of the electric wing-out headrest according to the present disclosure is rotated inwards.

Referring to FIG. 9, when the first slider 120 is moved downwards to the maximum and the second slider 130 is moved rearwards to the maximum position, as shown in FIG. 7, the wing-out frame 150 is maintained in its original position, that is, the same is rotated outwards to the maximum.

When the lead screw 112 is rotated in place in one direction according to driving of the motor 110 in the state in which the wing-out frame 150 is rotated outwards to the maximum as described above, the first slider 120 may be linearly moved upwards.

More specifically, since the lead screw 112 is inserted into and coupled to the screw hole 122 of the first slider 120 so as to be rotatable in place, and the elevating guide pin 102 mounted on the rear frame 100 is inserted into the elevating guide hole 125 of the first slider 120, the first slider 120 may be linearly moved upwards when the lead screw 112 is rotated in place in one direction.

Furthermore, as shown in FIG. 10, when the first slider 120 is linearly moved upwards, the first slider 120 pushes the second slider 130 so as to linearly move the same forwards, thereby performing forward linear movement of the second slider 130.

That is, when the first slider 120 is moved upwards, the inclined stepped slide 123 slidably contacts the slide rail 133 to push the same forwards, and as such, the second slider 130 may be moved forwards.

In more detail, the inclined stepped slides 123 respectively formed on the opposite portions of the first body part 121 of the first slider 120 are respectively inserted into and mounted on the slide rails 133 of the second slider 130 so as to slidably contact the second slider 130. Accordingly, when the first slider 120 is moved upwards, each of the inclined stepped slides 123 slidably contacts a corresponding one of the slide rails 133 to push the second slider 130 forwards.

In this case, since the straight guide pins 103 mounted on the rear frame 100 are respectively inserted into the straight guide holes 134 formed in the second body part 131 and the push-and-pull plate 132 of the second slider 130, the second slider 130 may be linearly moved forwards.

Meanwhile, when the first slider 120 is moved upwards, the stopper nut 113 serves as a stopper configured to contact the outer peripheral surface of the screw hole 122 formed in the bottom surface of the elevating distance limiting groove 126. Accordingly, the maximum upward movement of the first slider 120 and the maximum forward movement distance of the second slider 130 may be limited.

Furthermore, when the second slider 130 is moved forwards, the push-and-pull plate 132 pushes the wing-out link 140 forwards, and the wing-out link 140 also pushes the wing-out frame 150 forwards. Accordingly, as shown in FIG. 8, the wing-out frame 150 is rotated inwards around the hinge end 161 in the hinge case 151.

In this manner, when the first slider 120 is linearly moved upwards by rotation in one direction of the lead screw 112 according to driving of the motor 110 to push the second slider 130 forwards, the wing-out link 140 coupled to the second slider 130 pushes the wing-out frame 150 forwards and rotates the same inwards, thereby making it possible to automatically adjust the angle of a wing-out pad having the wing-out frame 150 as a skeleton.

In addition, since the angle of the wing-out pad is automatically adjusted depending on the position of the occupant's head, it is possible not only to provide an occupant with convenience in using the electric wing-out headrest, but also to improve comfortable support for the opposite portions of the occupant's head. As a result, it is possible to improve supporting force of the wing-out pad with respect to the opposite portions of the occupant's head, thereby preventing the wing-out pad from being rotated rearwards to return to its original position during use.

Meanwhile, when the lead screw 112 is rotated in place in the other direction according to driving of the motor 110, the first slider 120 may be linearly moved in the downward direction, and when the first slider 120 is vertically moved in the downward direction, the inclined stepped slide 123 slidably contacts the slide rail 133 to pull the same rearwards. Accordingly, the second slider 130 is moved rearwards so as to return to its original position.

In addition, when the second slider 130 is moved rearwards and the push-and-pull plate 132 pulls the wing-out link 140 rearwards, the wing-out link 140 also pulls the wing-out frame 150 rearwards, and as such, the wing-out frame 150 may be rotated outwards around the hinge end 161 in the hinge case 151 to return to its original deployment position.

As is apparent from the above description, the present disclosure provides the following effects.

First, a first slider is linearly moved upwards and downwards by driving of a motor to push a second slider forwards or pull the same rearwards, and a wing-out link coupled to the second slider rotates a wing-out frame forwards or rearwards, thereby making it possible to automatically adjust the angle of a wing-out pad having the wing-out frame as a skeleton.

Second, the angle of the wing-out pad is automatically adjusted depending on the position of the occupant's head, thereby making it possible not only to provide the occupant with convenience in using an electric wing-out headrest, but also to improve comfortable support for the opposite portions of the occupant's head.

Third, it is possible to improve supporting force of the wing-out pad with respect to the opposite portions of the occupant's head, thereby preventing the wing-out pad from being rotated rearwards to return to its original position during use.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and equivalents thereto.

The invention claimed is:

1. An electric wing-out headrest comprising:

a rear frame connected to a stay;

a motor mounted on the rear frame, the motor having a lead screw connected to an output part of the motor;

a first slider coupled to the lead screw and positioned in front of the rear frame to be movable up and down;

a second slider coupled to the rear frame and to the first slider to be movable forwards and rearwards;

a wing-out element configured to each of opposite portions of the second slider;

a fixed frame coupled to the rear frame and spaced apart from a front portion of the second slider; and a wing-out frame hingedly coupled to the fixed frame;

wherein the wing-out element configured to push or pull the wing-out frame.

2. The electric wing-out headrest of claim 1, wherein the first slider comprises:

a first body part having a screw hole formed to penetrate the first body part in a vertical direction, wherein the lead screw is inserted into and coupled to the screw hole, the first body part having inclined stepped slides protruding from opposite portions of the first body part, wherein the inclined stepped slides are inserted into and coupled to the second slider to slidably contact the second slider; and elevating guide wings extending from opposite ends of the first body part and coupled to the rear frame to be movable up and down.

3. The electric wing-out headrest of claim 2, wherein the inclined stepped slides are inclined downwards and forwards to push the second slider forwards when the first slider is moved upwards or pull the second slider rearwards when the first slider is moved downwards.

4. The electric wing-out headrest of claim 2, wherein an elevating guide hole is formed in each of the elevating guide wings, and an elevating guide pin inserted into the elevating guide hole is mounted on a front portion of the rear frame.

5. The electric wing-out headrest of claim 2, wherein the first body part has an elevating distance limiting groove, the elevating distance limiting groove being configured to limit an elevating distance of the first slider, and the screw hole is formed in a bottom surface of the elevating distance limiting groove.

6. The electric wing-out headrest of claim 5, wherein the lead screw has a stopper nut coupled to an upper end of the lead screw, the stopper nut having a larger diameter than a diameter of the screw hole.

7. The electric wing-out headrest of claim 1, wherein the wing-out element may be configured as a wing-out link having one end fastened to both sides of the second slider and the other end hinged to the wing-out frame.

8. The electric wing-out headrest of claim 7, wherein the second slider comprises:

a second body part having inclined slide rails formed at opposite portions of a rear portion of the second body part and coupled to the first slider to slidably contact the first slider forwards and rearwards; and push-and-pull plates extending from opposite ends of the second body part and coupled to rear ends of the wing-out link.

9. The electric wing-out headrest of claim 8, wherein the inclined slide rails of the second slider are inclined downwards or upwards and forwards so that inclined stepped slides of the first slider are inserted into and mounted on the inclined slide rails to slidably contact the inclined slide rails.

10. The electric wing-out headrest of claim 8, wherein each of the second body part and the push-and-pull plate has a straight guide hole, and the rear frame has a straight guide pin inserted into the straight guide hole.

11. The electric wing-out headrest of claim 8, wherein the push-and-pull plate has coupling grooves formed at an upper end and a lower end of a front surface of the push-and-pull plate, wherein the rear ends of the wing-out link are inserted into and coupled to each of the coupling grooves.

12. The electric wing-out headrest of claim 7, wherein the wing-out link comprises:

a pillar part having a predetermined length;

first connection bars extending rearwards from each of an upper end and a lower end of the pillar part and coupled to the second slider; and second connection bars extending forwards from each of the upper end and the lower end of the pillar part and hingedly coupled to a rear portion of the wing-out frame.

13. The electric wing-out headrest of claim 1, wherein hinge ends are integrally formed with and disposed at opposite portions of the fixed frame, and the wing-out frame has hinge cases formed at inner ends of the wing-out frame, wherein the hinge ends are inserted into and coupled to the hinge cases.

14. The electric wing-out headrest of claim 1, wherein a stay coupling block is formed on a rear surface of the rear frame, and the stay is inserted into and coupled to the stay coupling block having the stay.

* * * * *